United States Patent
Kuwayama et al.

(10) Patent No.: US 7,012,872 B2
(45) Date of Patent: Mar. 14, 2006

(54) IMAGE READING DEVICE FOR AN OPTICAL DEVICE

(75) Inventors: Yasunori Kuwayama, Osaka (JP); Tadashi Tachibana, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 937 days.

(21) Appl. No.: 09/752,726

(22) Filed: Jan. 3, 2001

(65) Prior Publication Data

US 2001/0008565 A1 Jul. 19, 2001

(30) Foreign Application Priority Data

Jan. 7, 2000 (JP) .................................... 2000-000027

(51) Int. Cl.
*G11B 5/09* (2006.01)

(52) U.S. Cl. ................ 369/59.17; 369/59.21; 369/124.25

(58) Field of Classification Search ............. 369/59.17, 369/59.18, 59.19, 59.21, 59.22, 124.05, 124.11, 369/124.15, 53.31, 53.36, 94, 47.17, 47.18, 369/275.3, 47.53, 275.4, 47.51, 44.29, 53.1, 369/53.18, 47.15, 59.11, 59.12, 47.3, 47.52, 369/44.32, 53.34
See application file for complete search history.

(56) References Cited

U.S. PATENT DOCUMENTS 6,747,924 B1 * 6/2004 Muramatsu .............. 369/44.29

FOREIGN PATENT DOCUMENTS

| CN | 1119895 A | 4/1996 |
|---|---|---|
| CN | 1221175 A | 6/1999 |
| JP | 58-203635 | 11/1983 |
| JP | 2-58708 | 12/1990 |
| JP | 09-265629 | 10/1997 |
| JP | 10-188291 | 7/1998 |
| JP | 11-134800 | 5/1999 |

* cited by examiner

*Primary Examiner*—Thang V. Tran
(74) *Attorney, Agent, or Firm*—Morgan, Lewis & Bockius LLP

(57) ABSTRACT

When an optical disc is set to the motor, the slice level is set to a slice level Sk as a reference slice level and a measured jitter value A (S0, S1) is produced. The slice level is incremented in steps of a fixed quantity Si (S2). Then, a measured jitter value B obtained at the incremented slice level is compared with the previous measured jitter value A (S3, S4). This sequence of process is repeated, and when the measured jitter value A is smaller than the counter value, it is judged that the jitter changes its quantity varying direction to a decreasing direction. Then, the incrementing operation of the slice level is immediately stopped, and the slice level is decremented in steps of another fixed quantity Sd (<Si). The previous measured jitter value C is compared with a measured jitter value D after the slice level is decremented (S5 to S8). When the measured jitter value C is smaller than the counter jitter value, it is judged that the slice level detected at that time is an optimum slice level.

5 Claims, 4 Drawing Sheets

IMAGE READING DEVICE FOR AN OPTICAL DEVICE

BACKGROUND OF THE INVENTION

The present invention relates to an image reading device for an optical disc in which the setting of an optical disc to a related location is detected by a detecting section, information is read out of the optical disc of which the setting is detected, by means of a reading section, and an RF signal output from the reading section is binarized at a predetermined slice level, which is set by slice level setting means.

To read information that is stored in an optical disc, such as CD or DVD, from the disc, an optical disc 1 is set to a spindle motor 2 which is driven and rotating, as shown in FIG. 4. A light beam emitted from an optical pick-up 3 is irradiated onto the optical disc 1. Whether or not the optical disc 1 is set to the motor is detected depending on the presence or absence of light reflected from the optical disc. Upon detection of the setting of the optical disc 1, the pick-up 3 reads out information from the optical disc 1 and then produces an RF signal. The RF signal is amplified by an RF amplifier 4, and binarized at a predetermined slice level for binarizing. The binarized signal output from the RF amplifier 4 is decoded by a decoder 5, and error and jitter contained therein are detected and processed for error correction and the like.

In this case, the slice level in the RF amplifier 4 is set by means of a slice level setting means, which is attached to or contained in a microcomputer (referred frequently to as MICON) 6 for the servo control.

An example of a binarizing circuit in the RF amplifier 4 is constructed as shown in FIG. 5. An RF signal output from the pick-up 3 is input to a non-inverting input terminal of a comparator 8. An output voltage signal of a slice level setting means 9 is input an inverting input terminal of the comparator 8. The voltage signal output from the slice level setting means 9 is basically a voltage signal appearing at a variable terminal of a variable resistor. A voltage level at the variable terminal corresponds to a slice level at the time of the binarizing.

Due to various factors, e.g., error and deformation, caused in forming disc maters and stampers for the optical discs 1 or molding the discs, an optimum slice level for the binarizing frequently offsets from a mid point of the RF signal, viz., a center of a maximum amplitude of the RF signal, and is different for each disc.

Although the optimum slice level is thus different for each optical disc 1, the slice level set by the slice level setting means 9 is set at a fixed value. As a result, the slice level by the slice level setting means 9 shifts from the mid point of the RF signal for the optical disc 1, and the error and jitter are increased in the signal produced by decoding the binarized signal of the RF signal by the decoder 5. Consequently, information is not read out of the optical disc 1 precisely.

Techniques to change the slice level when the binarizing is carried out are described in the Unexamined Japanese Patent Application Publication Nos. Sho 58-203635 and Hei 10-188291. In the former publication, the slice level is followed up so as to minimize an error rate by the utilization of the feedback control. In the latter publication, a slice level signal is generated following up a readout signal, by using the peak and bottom values of the readout signal. In both the techniques, the follow-up control is constantly performed. Therefore, the control procedure is extremely complicated.

In the Examined Japanese Patent Application Publication No. Hei 2-58708, there is a description that an optimum slice level is set corresponding to a PCM (pulse code modulation) signal. Also in this technique, the follow-up control procedure is very complicated. Accordingly, the technique is different from the present invention which sets the slice level so as to minimize the jitter of the RF signal read out of the optical disc.

SUMMARY OF THE INVENTION

Accordingly, an object of the present invention is to provide an image reading device which can obtain, every optical disc, an optimum slice level in binarizing the RF signal by a simple adjustment.

According to the present invention, there is provided an image reading device for an optical disc in which the setting of an optical disc to a related location is detected by a detecting section, information is read out of the optical disc of which the setting is detected, by means of a reading section, and an RF signal output from the reading section is binarized at a predetermined slice level, which is set by slice level setting means, the improvement being characterized by an adjusting section for adjusting a slice level set by the slice level setting means to an optimum slice level which is best fit for the optical disc when the setting of the optical disc is detected by the detecting section (aspect 1).

With such an arrangement, when an optical disc is set to the spindle motor, the adjusting section adjusts the slice level to an optimum slice level which is best fit for the optical disc. Accordingly, the slice level used when the RF signal is binarized is adjusted to an optimum slice level for each optical disc, while dealing with error and deformation in forming the disc masters and stamper or molding the discs. Further, the slice level optimizing adjustment is performed for once, without constantly following up the RF signal, when the optical disc 1 is set to the motor. Accordingly, the slice level optimizing adjustment can simply be performed which is best fit for the optical disc.

In the image reading device, in a case where the optical disc is a multi-layer optical disc, the adjusting section adjusts, for each layer, the slice level set by the slice level setting means to the optimum slice level when the optical disc is set to a related location (aspect 2).

With such an arrangement, in a case that the optical disc is a multi-layer optical disc of which one surface consists of two layers, the slice level optimizing adjustment is performed for each layer when the optical disc is set. Therefore, the RF signal is binarized at an optimum slice level for each layer.

The image reading device further comprises a jitter detecting section for detecting a jitter of the RF signal, and when the adjusting section changes a slice level set by the slice level setting means, a slice level detected when the jitter detected by the jitter detecting section is at a minimum level is judged to be an optimum slice level (aspect 3).

With provision of the jitter detecting section, when the optical disc is set to the motor, the slice level optimizing adjustment is performed which is best fit for the optical disc.

Further, the image reading device further comprises a jitter detecting section for detecting a jitter of the RF signal, wherein an equalizer characteristics thereof is fixed, and when the adjusting section changes a slice level set by the slice level setting means and the jitter detecting section detects at least two slice levels, a slice level detected when the jitter detected by the jitter detecting section is at a minimum level is judged to be an optimum slice level. (aspect 4)

In the image reading device, the adjusting section increments a slice level set by the slice level setting means from a reference slice level in steps of a fixed quantity. When the jitter detected at the incremented slice level has a decreasing direction in quantity, the adjusting section repeatedly continues the incrementing of the slice level till the jitter changes its quantity varying direction to an increasing direction. When the jitter detected at the incremented slice level has an increasing direction, the adjusting section decrements the slice level from the reference slice level in steps of a predetermined fixed quantity. When the jitter detected at the decremented slice level has a decreasing direction, the decrementing of the slice level is repeatedly continued till a quantity varying direction of the jitter is changed to an increasing direction. In this way, the adjusting section judges that the slice level detected when the jitter changes its varying direction from the decreasing direction to the increasing direction or the increasing direction to the decreasing direction, takes a minimum value, and judges the slice level detected at that time to be an optimum slice level (aspect 5).

With this arrangement, a minimum value of the jitter detected by the jitter detecting section is detected, so that the slice level is easily adjusted to the optimum slice level.

The image reading method in the image reading device according to aspect 3, comprising the steps of:
(a) incrementing a slice level set from a reference slice level in steps of a fixed quantity,
(b) when the jitter detected at the incremented slice level has a decreasing direction in quantity, repeatedly continuing the incrementing of the slice level till the jitter changes quantity varying direction to an increasing direction,
(c) when the jitter detected at the incremented slice level has an increasing direction in quantity, decrementing the slice level from the reference slice level in steps of a predetermined fixed quantity,
(d) when the jitter detected at the decremented slice level has a decreasing direction in quantity, repeatedly continuing the decrementing of the slice level till a quantity varying direction of the jitter is changed to an increasing direction,
(e) judging that the slice level detected when the jitter changes varying direction from the decreasing direction to the increasing direction or the increasing direction to the decreasing direction, takes a minimum value, and
(f) judging the slice level detected at that time to be an optimum slice level. (aspect 6)

DETAILED DESCRIPTION OF THE PREFERRED EMBODIMENTS

Figure 1:
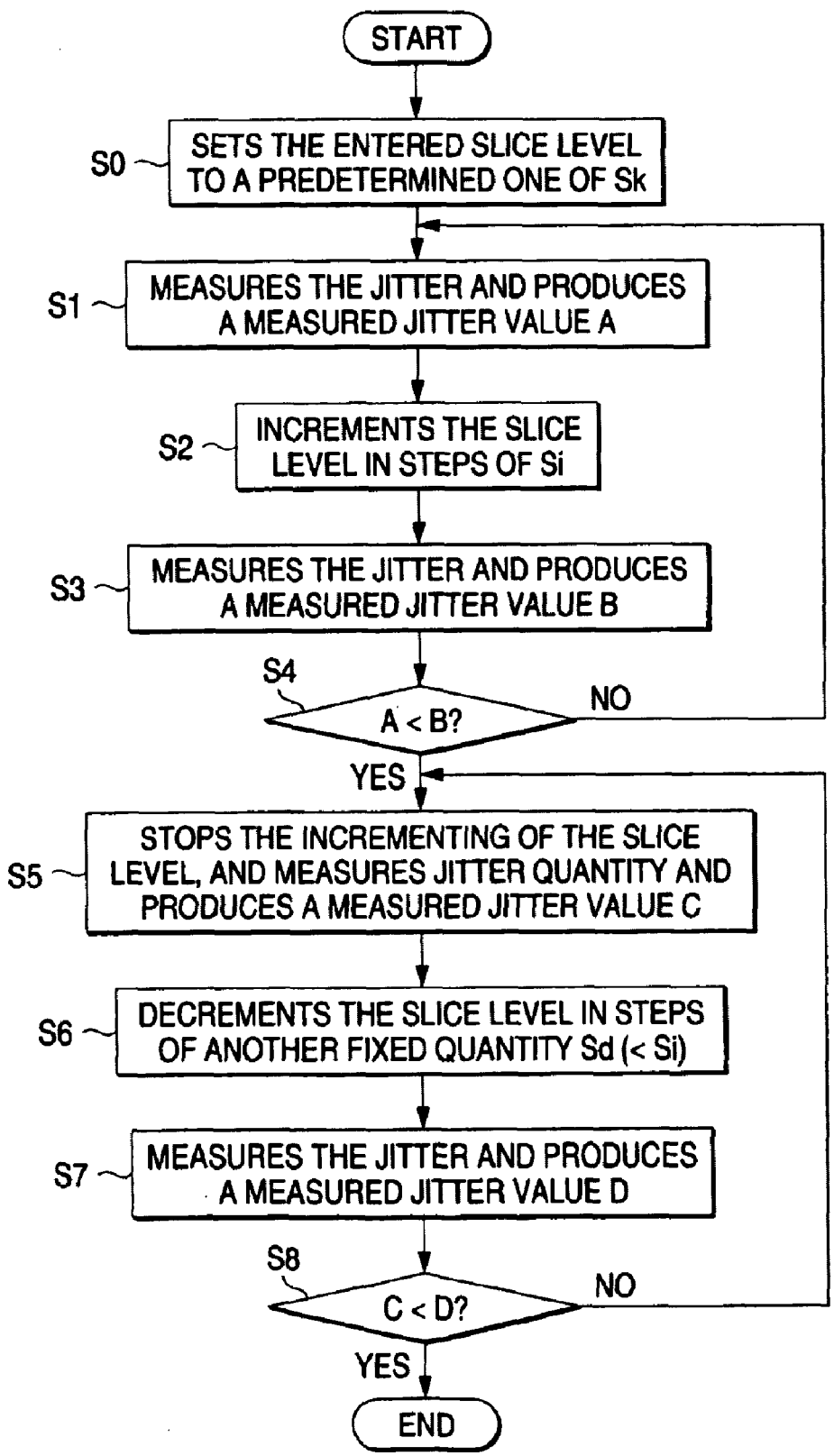
FIG. 1 is a flow chart showing an operation of an image reading device for an optical disc, which is an embodiment of the present invention.
Figure 2:
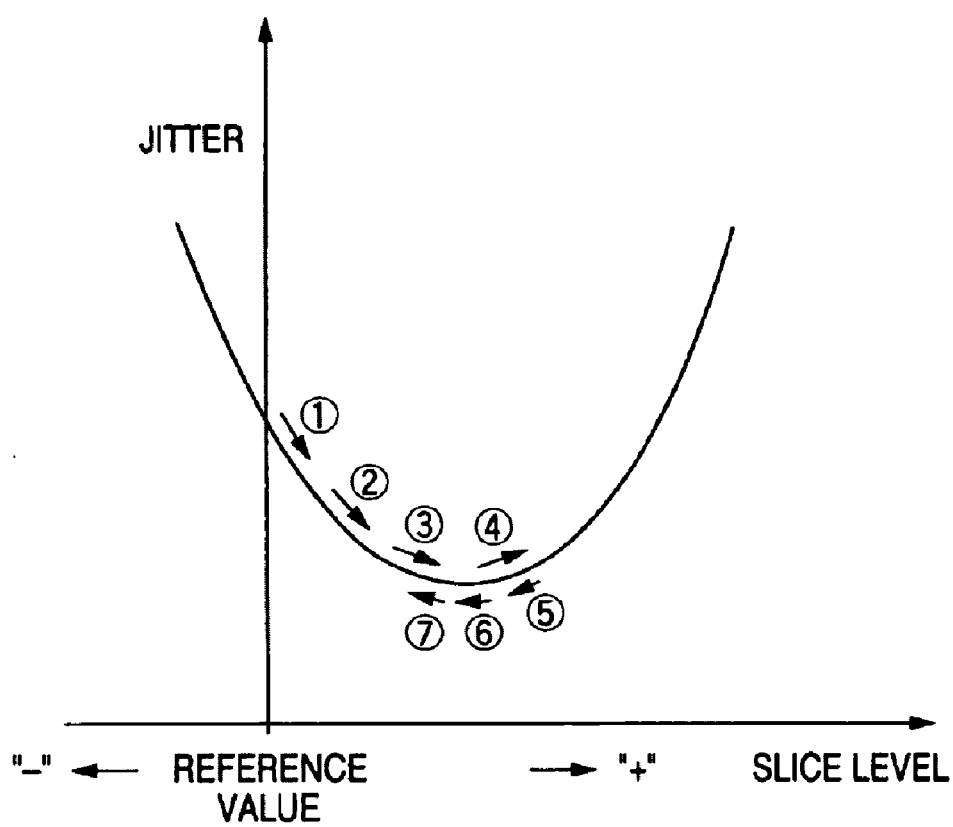
FIG. 2 is a graph useful in explaining the operation of the image reading device.
Figure 4:
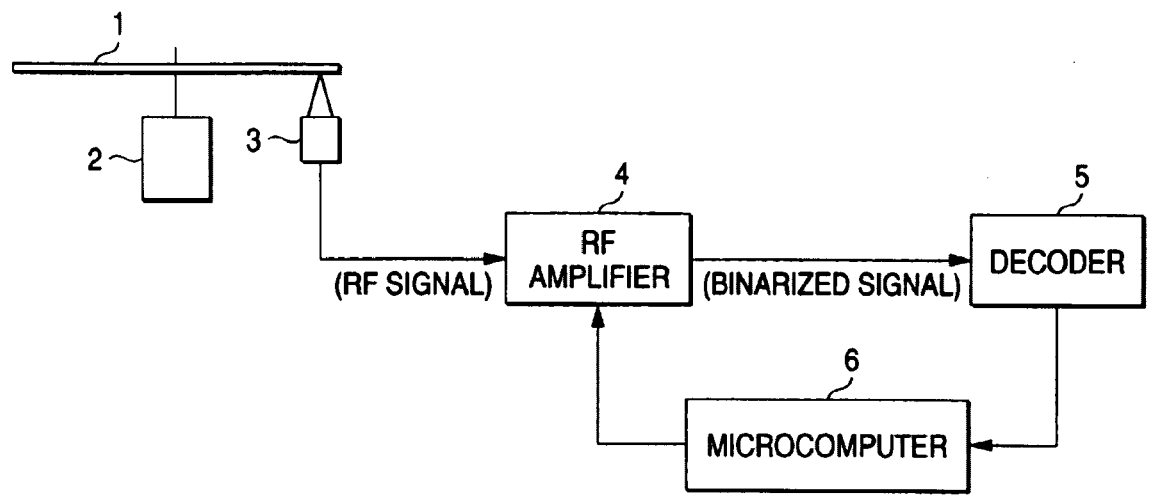
FIG. 4 is a diagram showing in block and schematic form an arrangement of an image reading device into which the present invention is incorporated.
Figure 5:
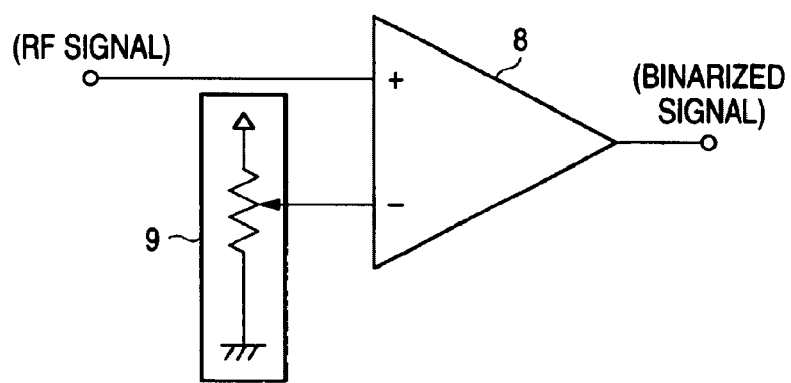
FIG. 5 is a block diagram showing a part of the FIG. 4 image reading device.
Figure 6:
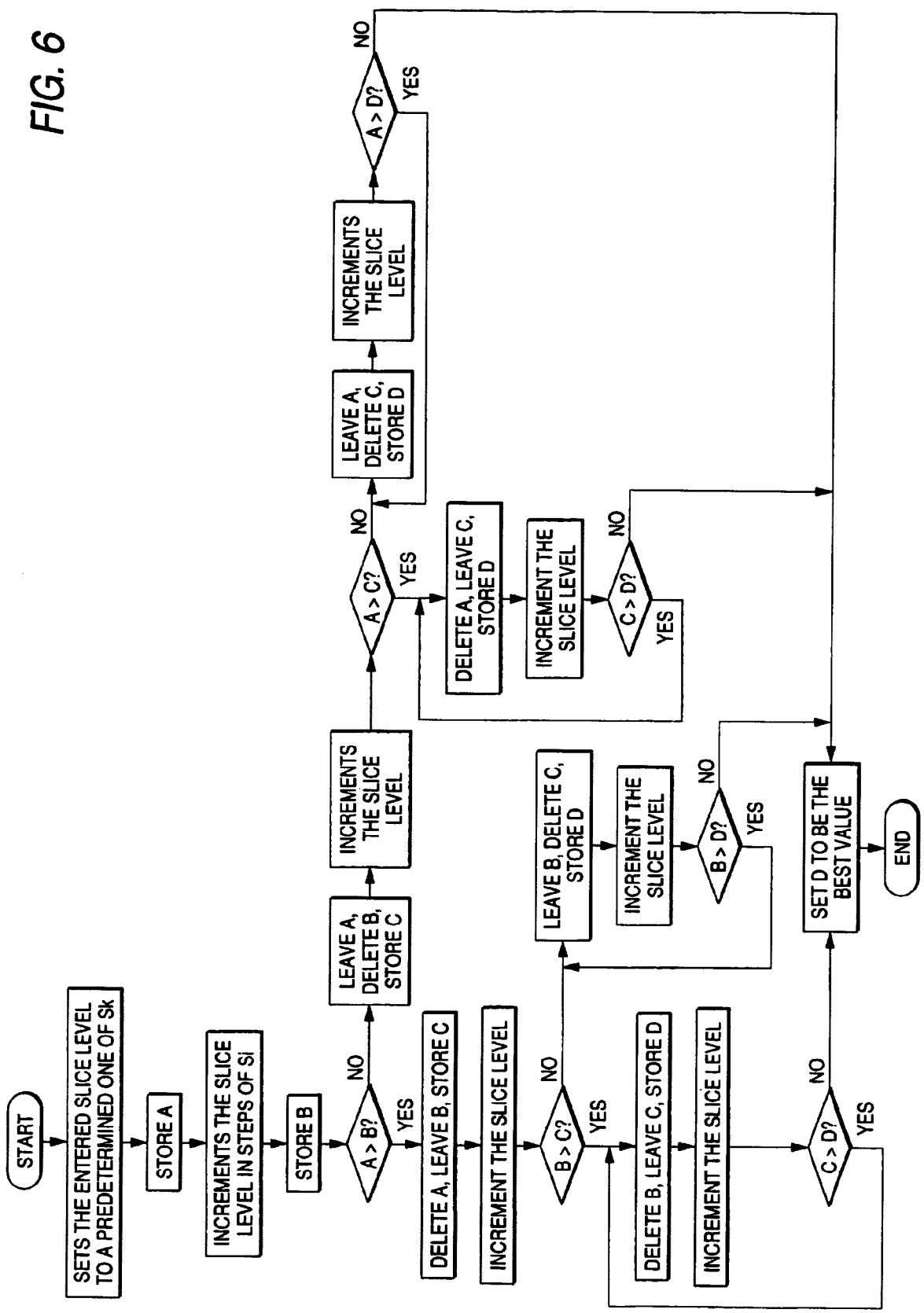
FIG. 6 is a flow chart showing an operation of an image reading device for an optical disc, which is another embodiment of the present invention.

An embodiment of an image reading device for an optical disc according to the present invention will be described with reference to FIGS. 1 and 2. FIG. 1 is a flow chart for explaining the operation of the image reading device. FIG. 2 is a graph for explaining the operation of the image reading device. A basic construction of the image reading device of this embodiment is substantially the same as of the FIGS. 4 and 5 image reading device. Accordingly, FIGS. 4 and 5 will also be referred to in the description to follow.

In the embodiment, a light beam is irradiated on an optical disc 1, from an optical pick-up 3 functioning as a detecting section. When the setting of the optical disc 1 to the spindle motor is detected depending on the presence or absence of light reflected by the optical disc, the pick-up 3 functioning as a detecting section reads information from the optical disc 1. An RF signal output from the pick-up 3 is amplified by an RF amplifier 4, while the RF signal is binarized at a preset reference slice level. A binarized signal output from the RF amplifier 4 is decoded by a decoder 5 as a jitter detecting section, and error and jitter are detected.

A microcomputer 6 repeatedly detects jitter while incrementing the slice level output from a slice level setting means 9 in steps of a fixed quantity. The microcomputer judges a slice level detected when the detected jitter is at a minimum level to be an optimum slice level. The process of adjusting the slice level by the microcomputer 6 corresponds to an adjusting section.

Judgement as to whether or not jitter detected by the decoder 5 is at a minimum level will be made in the following way.

A slice level set by the slice level setting means is incremented from a predetermined reference slice level in steps of a fixed quantity. When the jitter detected at the incremented slice level has a decreasing direction in quantity, the incrementing of the slice level is repeatedly continued till the jitter changes its quantity varying direction to an increasing direction. When the slice level is incremented from the reference slice level in steps of a fixed quantity, if the jitter detected at the incremented slice level has an increasing direction in quantity, the slice level is decremented from the reference slice level in steps of a fixed quantity. If the jitter detected at the incremented slice level has a decreasing direction, the slice level is decremented till the jitter changes its quantity varying direction to the increasing direction. The microcomputer judges that the jitter is at a minimum level when the jitter changes its quantity varying direction from the decreasing direction to the increasing direction.

A specific process of making the judgement as to whether or not the jitter is at a minimum level will be described with reference to a flow chart show in FIG. 1. As shown, when the setting of the optical disc 1 to the spindle motor is detected, the microcomputer 6 first sets a slice level, which is set by the slice level setting means 9, to a predetermined reference slice level Sk (S0). Jitter detected when the slice level is at the reference slice level Sk is measured and a measured jitter value A is produced (S1). The measured jitter value A is stored in a RAM or the like contained in the microcomputer 6. The slice level is incremented in steps of a fixed quantity Si, from the reference slice level Sk (S2).

At the incremented slice level, the jitter is measured again and a measured jitter value B is produced (S3). The microcomputer compares the measured jitter value A, which was stored in the RAM or such in the step S1, with the present measured jitter value B (S4), and judges whether or not the former is smaller than the latter (S4). If the judging result is NO, viz., the pervious measured jitter value A is larger than the present one, the microcomputer judges that the jitter is decreasing in quantity, and returns to the step S1 and repeats the sequence of the steps S1 to S4. The process of the steps S1 to S4 may be depicted as indicated by (1) to (3) in a graph of FIG. 2.

If the answer to the step S4 is YES, the microcomputer 6 judges that the jitter, which has decreased in level, passes a minimum level in its quantity variation and increases in quantity level. Accordingly, the incrementing of the slice level is immediately stopped, and jitter quantity at that time is measured and a measured jitter value C is produced (S5). The measured jitter value C is stored in the RAM or such in the microcomputer 6, and the slice level whose incrementing has been stopped is decremented in steps of another fixed quantity Sd (<Si) (S6). While the slice level is thus decremented, the jitter is measured again.

As the result of the jitter measurement, a measured jitter value D is obtained (S7). Then, the microcomputer compares the measured jitter value C, which was stored in the RAM or the like in the step S5, with the present measured jitter value D, and judges if the former is smaller than the latter (S8). If the judging result is NO, viz., the previous measured jitter value C is larger than the present one, the microcomputer judges that the jitter is decreasing in quantity, and returns to the step S5 and repeats the sequence of the steps S5 to S8. The process of the steps S5 to S8 may be depicted as indicated by (5) to (7) in the graph of FIG. 2.

If the judging result in the step S8 is YES, the microcomputer 6 judges that the variation of the jitter passes its minimum level and the jitter changes its quantity variation direction to the increasing direction. Accordingly, the incrementing of the slice level is immediately stopped. The microcomputer judges that the slice level detected at that time is an optimum slice level, and stops its subsequent operation.

When the optical disc 1 is set to the motor, the adjustment of optimizing the slice level is performed for once. Accordingly, it is not required to constantly follow up the RF signal. The slice level optimizing adjustment can simply be performed which is bet fit for the optical disc, while dealing with error and deformation in forming the disc masters and stamper or molding the discs.

Thus, in the embodiment, the slice level can be adjusted, every optical disc 1, to an optimum slice level when the RF signal is binarized, and there is no need of constantly following up the RF signal. Further, this adjustment is carried out for once when the optical disc 1 is set to the spindle motor. Accordingly, the slice level optimizing adjustment, which is best fit for the optical disc 1, can be carried out in a simple manner. As a consequence, the data reading performance can be brought out to the full while repressing the occurrence of information reading error.

When the jitter is at a minimum level, an error rate of the RF signal is also minimized. This teaches that a minimum error rate can be obtained by optimizing the slice level when the jitter is minimized. As a result, the information reading error can be repressed to a minimum.

Figure 3:
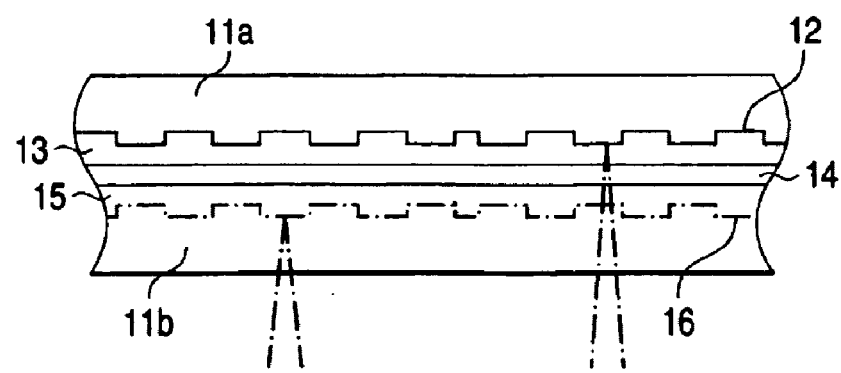
FIG. 3 is a sectional view showing another image reading device, which is a second embodiment of the present invention.

Another embodiment of the present invention will be described. In a case where the optical disc 1 consists of a multi-layer disc in which one surface consists of two layers as shown in FIG. 3. When the optical disc 1 is set to the motor, it is preferable that a slice level set by the slice level setting means 9 is adjusted to an optimum slice level in a procedure similar to the above-mentioned one by use of the microcomputer 6. In FIG. 3, reference numerals 11a and 11b designate polycabonate substrates as first and second layers; 12 is a reflecting film of the first layer; 13 is a transparent protecting film; 14 is a transparent adhesive layer; 15 is a transparent protecting film; and 16 is a transparent reflecting film of the second layer.

If so done and constructed, where the multi-layer disc is used, the RF signal can be binarized at an optimum level for each layer in a manner that the slice level optimizing adjustment is performed for each layer when the optical disc 1 is set to the motor. Accordingly, the data reading performance can be brought out to the full for each layer.

While the invention is applied to the optical disc 1 whose one surface consists of two layers, it is readily understood that the invention may be applied to the optical disc whose both surfaces consist each of one layer or a multiple of layers. The effects produced in this case are comparable with those of the second embodiment, as a matter of course.

It is readily understood that the present invention is not limited to the above-mentioned embodiments, but may variously be modified, altered and changed within the true spirits of the invention.

As seen from the foregoing description, when an optical disc is set to the spindle motor, the adjusting section adjusts the slice level to an optimum slice level which is best fit for the optical disc (aspect 1). Accordingly, the slice level is optimized when the RF signal is binarized, for each disc. Further, the slice level optimizing adjustment is performed for once, without constantly following up the RF signal, when the optical disc 1 is set to the motor. Accordingly, the slice level optimizing adjustment can simply be performed which is best fit for the optical disc. Further, the data reading performance can be brought out to the full while repressing the occurrence of information reading error. Thus, the present invention succeeds in providing an image reading device for optical discs, which has excellent performances.

In a case that the optical disc is a multi-layer optical disc of which one surface consists of two layers, the slice level optimizing adjustment is performed for each layer when the optical disc is set (aspect 2). Therefore, the RF signal is binarized at the optimum slice level, and the data reading performance can be brought out to the full for each layer.

With a further inventive and unique feature of the invention (aspect 3), the slice level optimizing adjustment is performed which is best fit for the optical disc when the optical disc is set to the motor.

Further, a minimum value of the jitter is detected by the jitter detecting section, and a slice level detected when the jitter takes the minimum value is used as an optimum slice level (aspect 4). Accordingly, the slice level used when the RF signal is binarized is easily be adjusted.

What is claimed is:

1. An image reading device for an optical disk, comprising:
    a detecting section for detecting the setting of an optical disc to a related location,
    a reading section for reading information out of said optical disc of which the setting is detected,
    slice level setting means for binarizing an RF signal output from said reading section at a predetermined slice level set by said slice level setting means,
    an adjusting section for adjusting a slice level set by said slice level setting means to an optimum slice level which is best fit for the optical disc, when the setting of the optical disc is detected by said detecting section, said adjusting section increments the slice level set by said slice level setting means from a reference slice level in steps of a fixed quantity, and a jitter detecting section for detecting a jitter of the RF signal, when said adjusting section changes the slice level set by said slice level setting means, the slice level detected when said jitter detected by said jitter detecting section is at a minimum level is judged to be the optimum slice level, when the jitter detected at the incremented slice level has a decreasing direction in quantity, said adjusting section repeatedly continues the incrementing of the slice level till the jitter changes quantity varying direction to an increasing direction, when the jitter detected at the incremented slice level has an increasing direction in quantity, said adjusting section decrements the slice level from the reference slice level in steps of a predetermined fixed quantity, when the jitter detected at the decremented slice level has a decreasing direction in quantity, the decrementing of the slice level is repeatedly continued till a quantity varying direction of the jitter is changed to an increasing direction, and said adjusting section judges that the slice level detected when the jitter changes varying direction from the decreasing direction to the increasing direction or the increasing direction to the decreasing direction, takes a minimum value, and judges the slice level detected at that time to be the optimum slice level.

2. The image reading device according to claim 1, wherein in a case said optical disc is a multi-layer optical disc, said adjusting section adjusts, for each layer, the slice level set by said slice level setting means to the optimum slice level, when the optical disc is set.

3. The image reading device according to claim 1, wherein an equalizer characteristic of the jitter detecting section is fixed, and when said adjusting section changes the slice level set by said slice level setting means and said jitter detecting section detects at least two slice levels, a slice level detected when said jitter detected by said jitter detecting section is at a minimum level is judged to be the optimum slice level.

4. An image reading method in an image reading device for an optical disk, the image reading device including:

a detecting section for detecting the setting of an optical disc to a related location, a reading section for reading information out of said optical disc of which the setting is detected, slice level setting means for binarizing an RF signal output from said reading section at a predetermined slice level set by said slice level setting means, an adjusting section for adjusting a slice level set by said slice level setting means to an optimum slice level which is best fit for the optical disc, when the setting of the optical disc is detected by said detecting section, and a jitter detecting section for detecting a jitter of the RF signal, wherein when said adjusting section changes a slice level set by said slice level setting means, a slice level detected when said jitter detected by said jitter detecting section is at a minimum level is judged to be an optimum slice level; the method comprising the steps of:

(a) incrementing the slice level set from a reference slice level in steps of a fixed quantity, (b) when the jitter detected at the incremented slice level has a decreasing direction in quantity, repeatedly continuing the incrementing of the slice level till the jitter changes quantity varying direction to an increasing direction, (c) when the jitter detected at the incremented slice level has an increasing direction in quantity, decrementing the slice level from the reference slice level in steps of a predetermined fixed quantity, (d) when the jitter detected at the decremented slice level has a decreasing direction in quantity, repeatedly continuing the decrementing of the slice level till a quantity varying direction of the jitter is changed to an increasing direction, (e) judging that the slice level detected when the jitter changes varying direction from the decreasing direction to the increasing direction or the increasing direction to the decreasing direction, takes a minimum value, and (f) judging the slice level detected at that time to be the optimum slice level.

5. An image reading method for an optical disc comprising the steps of:

(a) storing a jitter detected at a first slice level in a first memory, (b) storing a jitter detected at a second slice level larger than the first slice level in a second memory, (c) reading out the jitters stored in said first and second memories to compare, (d) after the comparison in the step (c), leaving the memory in said memory storing a smaller jitter and deleting the memory in said memory storing a larger jitter, (e) as a result of the comparison in the step (c), when a jitter of the first slice level is larger than a jitter of the second slice level, a third slice level larger than the second slice level is selected to detect a jitter so as to store in said memory in which the memory is deleted, and when a jitter of the first slice level is smaller than a jitter of the second slice level, a third slice level smaller than the first slice level is selected to detect a jitter so as to store in said memory in which the memory is deleted, (f) reading out to compare the jitter newly stored in the step (e) and the jitter left in the step (d), (g) according to the same processes as in the steps (d) and (e), deleting the memory in any one of said first and second memories to set a new slice level, and (h) repeating the processes as in the steps (c) to (g), at a time when a jitter by the new slice level becomes larger, the slice level at which a small jitter is detected is set to be the best slice level.

* * * * *